Oct. 1, 1940.   W. R. MARTIN   2,216,374
PRESSURE GAUGE WITH PROTECTING AND PULSATION DAMPING MEANS
Filed May 25, 1938   3 Sheets-Sheet 1

INVENTOR
WALTER R. MARTIN
BY James M. Abbott
ATTORNEY

Oct. 1, 1940.   W. R. MARTIN   2,216,374
PRESSURE GAUGE WITH PROTECTING AND PULSATION DAMPING MEANS
Filed May 25, 1938   3 Sheets-Sheet 3

INVENTOR
WALTER R. MARTIN
BY James M. Abbott
ATTORNEY

Patented Oct. 1, 1940

2,216,374

UNITED STATES PATENT OFFICE 2,216,374

PRESSURE GAUGE WITH PROTECTING AND PULSATION DAMPING MEANS

Walter R. Martin, Long Beach, Calif.

Application May 25, 1938, Serial No. 209,899

2 Claims. (Cl. 73—31)

This invention relates to measuring devices, and particularly pertains to a pressure gauge with protecting and pulsation damping means.

In the operation of various types of equipment, and particularly in connection with oil well drilling operations in which a drilling fluid is circulated downwardly through the drill pipe and upwardly from the well, it is desirable to be able to continuously be apprised of the pressure under which the drilling fluid is being delivered by mud pumps. Such pressures are difficult to measure due to the fact that the drilling fluid is of heavy gravity and must be maintained in continuous circulation through the apparatus so that its suspended solids will not accumulate and choke the conduits at any point in their flow, and for the further reason that since the fluids are under a state of high pressure there is possibility that gauges and apparatus associated therewith will be clogged or bursted by the fluid. It is the principal object of the present invention therefore to provide a fluid pressure gauge which is associated directly with the conduit through which a fluid to be measured flows, and which gauge is decidedly rugged in construction and is provided with means whereby the gauge elements will be protected from fluid pulsation and excessive pressure, and whereby the gauge structure will respond to fluid pressures over a wide range of pressure variation.

The present invention contemplates the provision of a gauge structure directly associated with a conduit through which a fluid under pressure flows and between which gauge and conduit is interposed pressure damping and control means.

The invention is illustrated by way of example in the accompanying drawings in which.

Figure 1:
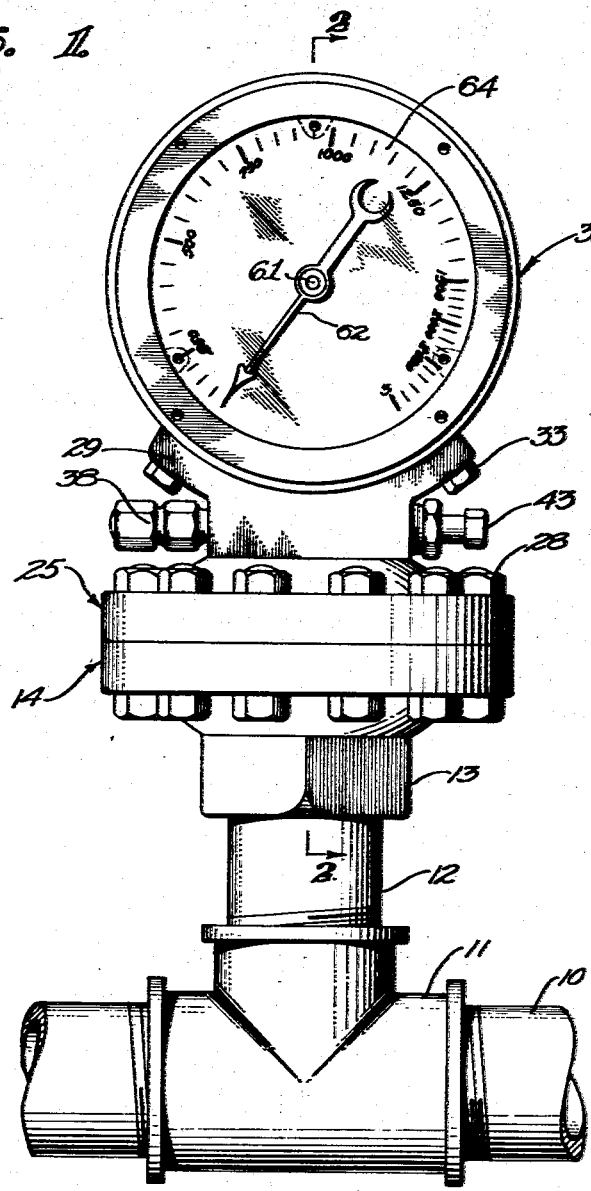
Figure 1 is a view in elevation showing the fluid pressure gauge with which the present invention is concerned.
Figure 2:
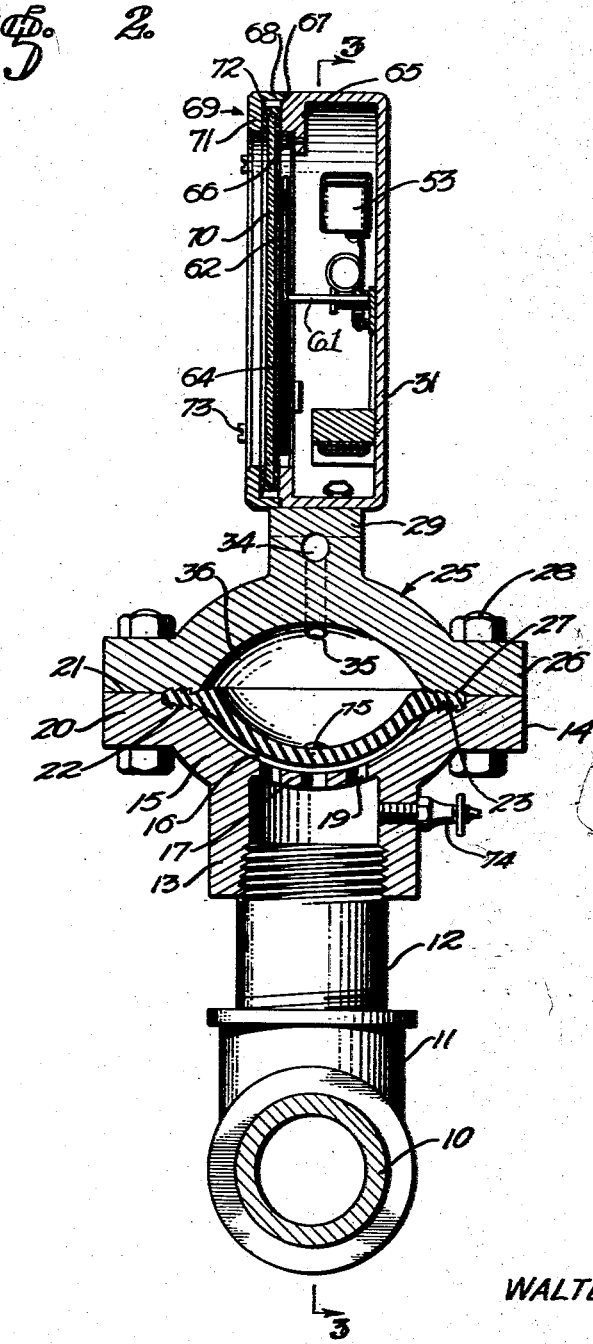
Fig. 2 is a view in central vertical section through the gauge as seen on the line 2—2 of Fig. 1.

Referring more particularly to the drawings 10 indicates a conduit through which a fluid flows. In the present instance it is desirable for the conduit to be filled with a continuous flow of drilling mud, such as is used in oil well drilling. This mud which is of a controlled gravity and consistency is delivered to the conduit by mud pumps not shown in the drawings, and is forced through the conduit under excessive pressure, which pressure under certain conditions may be as much as 5000# per square inch. A structure of this particular type is shown in United States Letters Patent No. 2,037,425, issued April 14, 1936, and entitled "Means for measuring fluid pressures," over which structure the present invention is an improvement. The conduit 10 is here shown as fitted with a T 11 to which is connected a standpipe 12. The upper end of the standpipe is threaded and receives the boss 13 of a lower gauge housing 14. The main body of the gauge housing 14 is in the form of a shell portion 15 which represents the segment of a sphere. The inner wall surface 16 is smooth and describes the segment of a sphere. A central portion 17 thereof bridges the end of a cylindrical opening 18 in the member 13 and is formed with perforations 19 through which fluid may flow. Circumscribing the shell 15 is an annular bolting flange 20 which has an upper flat face 21 terminating in a serrated face 22. The serrated face circumscribes the cavity in the shell and is formed by a plurality of concentric V-shaped corrugations. Seated upon these corrugations is an annular marginal flange 23 of a diaphragm 24. The body of the diaphragm represents the segment of a sphere and its outer surface conforms substantially to the surface 16 of the shell 15. Mounted over the shell 15 is a complementary shell member 25 having a bolting flange 26. This flange has a flat face resting against the face 21 of the flange 20 on the lower shell and a corrugated face 27 complementary to the corrugated face 22 of the lower member. Between these corrugated faces the marginal flange 23 of the diaphragm 24 is clamped and held by flange bolts 28 arranged around and passing through the flanges 20 and 26. The shell 25 is formed with an upwardly projecting portion which terminates in an arcuate flange 29. This flange has a face 30 which receives the cylindrical case 31 of a gauge 32. The case is held in its seat on the flange by cap screws 33. Intermediate the position of the gauge 32 and the upper shell 25 a transverse passageway occurs through the body of the member 29. This passageway includes a duct 34 having a vertical duct 35 communicating therewith. The vertical duct 35 establishes communication between the duct 34 and the chamber 36 which is formed between the in. At one end of the duct 34 is a threaded sleeve 37 which houses a check valve 38. The sleeve is threaded into a counterbore in the end of the duct 34. At the opposite end of the duct 34 a bore 39 is formed. One end of the bore 39 is formed with a tapered threaded portion 40 for a purpose to be hereinafter described and the opposite end of the bore 39 is formed with an enlarged counterbore 41 receiving a stuffing gland 42. Extending through the stuffing gland is a choke valve stem 43 which is of a diameter less than the diameter of the bore 39 and thus forms a fluid space 44 which is within the bore and around the stem. Mounted at the inner end of the stem 43 is a threaded valve element 45. This threaded valve element carries a tapered thread which fits into the threaded portion 40 of the bore 39. The relationship of the threaded portion 40 to the threaded portion 45 of the valve stem is such as to cause a slight space to occur between the threads along one of their faces. This will form a spiral passageway along and around the threads which passageway will be reduced in sectional area as the stem is rotated. The structure will therefore provide a valve choke of the type shown in United States Patent No. 2,091,764, issued August 31, 1937, entitled "Pressure damper." The detail of construction of the pressure damper is shown in fragmentary view 4 of the drawings and in which the fluid space is indicated at 46.

Formed through the member 29 and communicating with the space 44 of the bore 34 is a threaded opening 47 into which a threaded sleeve 48 extends. Secured to said sleeve by a fitting 49 is a fluid tube 50. This tube connects with a mounting element 51 having a passageway 52 therein which receives one end of a Bourdon tube 53. The fitting 51 also carries a bracket extension 54 upon which a pivot pin 55 is mounted. A gear segment 56 is pivoted on this bracket. This segment is formed with a slotted extension arm 57 which receives a screw 58 by which a bi-metallic temperature compensating link 59 is attached to the slotted member. The opposite end of the bi-metallic link is attached to the free end of the Bourdon tube 53 and motion of the tube is imparted to the gear 56 through this link. The gear segment 56 is in mesh with a gear pinion 60 which is pivoted on the bracket 54 and carries a spindle 61 upon the opposite end of which is fitted an indicating hand 62. Disposed in the path of travel of the gear segment 56 is a pin 63 which has a predetermined degree of flexibility. This pin is encountered after the gear has moved a predetermined distance and thus the pin will impose additional resistance to the movement of the gear through a portion of the gear's path of travel so that the relative movement of the gear segment during that particular period will be less than the normal movement under influence of the same pressure. This makes it possible for the indicating hand 62 to indicate the normal usual pressures by wider increments of graduations on a dial 64 while the higher pressures which are not usual would be indicated by smaller increments of graduation on the dial. By reference to Fig. 1 it will be seen that the range of pressure up to 1500# per square inch extends over approximately 240° of the dial surface and that the higher pressures are indicated on a smaller segment of approximately 60°. It will be evident that the space between graduations of pressure up to 1500° on the dial as here arranged will be much larger and more easy for the operator to observe than if the 3000# of pressure was indicated in graduations of equal spacing.

The dial 64 is mounted within a recess on an annular face flange 65 of the gauge case 31. It is held in place by suitable screw 66. The front face of the member 65 is formed around its marginal edge with a recessed shoulder 67. This shoulder receives the circumferential flange 68 of the glass retaining ring 69. Attention is directed to the fact that this ring is of unusual strength due to the fact that it is of angle cross-section, the metal thickness being relatively heavy so that the marginal portion of the glass 70 will be protected. The overhanging front flange 71 of the ring houses a rubber gasket 72 which is of channel shape and is circumscribed by the cylindrical flange 68 of the ring. This gasket also embraces the marginal edge of the glass 70 and when screws 73 are tightened the face flange 71 of the ring 69 will securely clamp the gasket 72 and the glass 70 between the opposing faces of the elements 65 and 71. The screws 73 extend through the ring and into the threaded opening in the flange 65 of the case 31. In order to drain air out of the line 10 in the pipe 11 a drain plug or petcock 74 is provided and extends into the portion 13 into which the pipe 12 is threaded.

Figure 3:
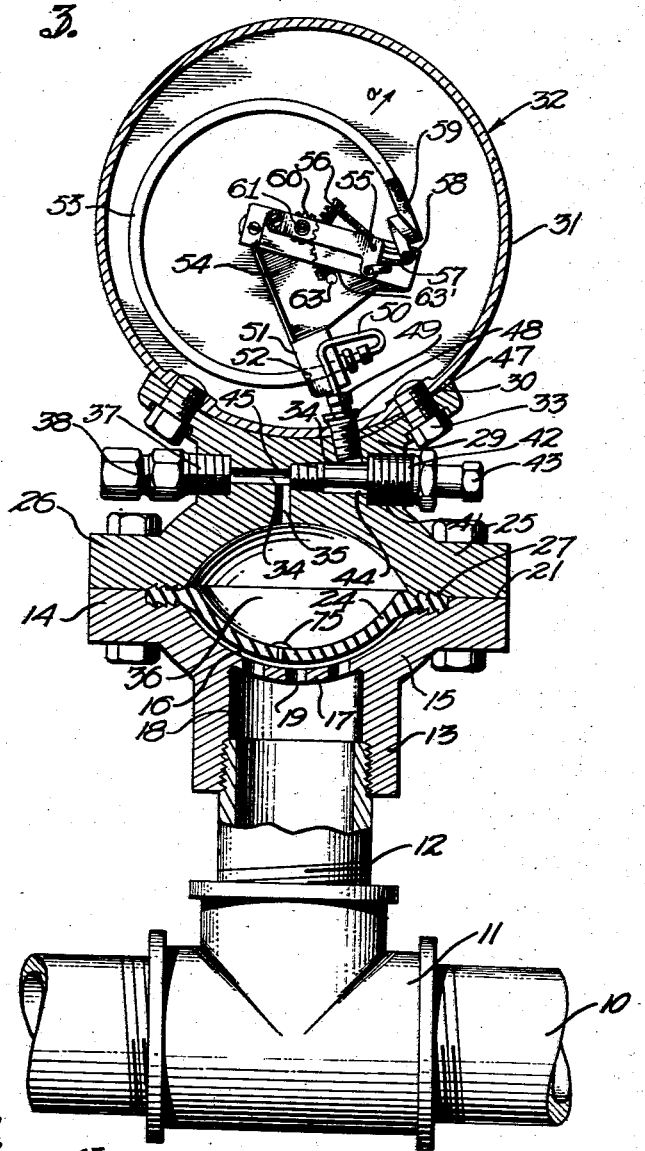
Fig. 3 is a view in vertical central section through the gauge as seen on the line 3—3 of Fig. 2.
Figure 4:
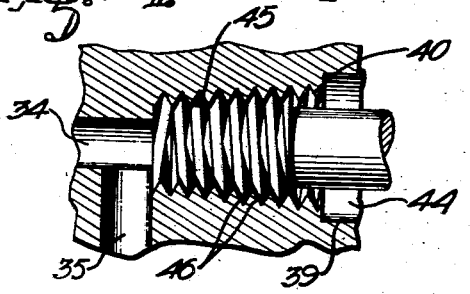
Fig. 4 is a fragmentary view in section and elevation showing the valve element of the pressure damper.

In operation of the present invention the structure is assembled as shown in the drawings and is mounted upon the stand pipe 12. The stopcock or plug 74 may then be opened to bleed the air out of the line and to permit the liquid to fill the stand pipe 12, the member 13, and to pass through the perforations 19 into the portion of the cavity 36 below the diaphragm 24. It is understood that a suitable incompressible fluid fills the cavity on the opposite side of the diaphragm 24 and also fills the ducts 34 and 35, the annular passageway 44, and the Bourdon tube 53. As pressure is imposed upon the liquid in the pipe line 10 the diaphragm 24 will be flexed upwardly. This diaphragm carries a rivet 75 which will register with the end of the duct 35 so that when the diaphragm 24 is flexed until it has reversed the direction of its curvature and is forced against the concaved face within the upper shell 25, the rivet 75 will prevent the portion of the diaphragm which covers the end of duct 35 from being forced into the duct. This will thus prevent the diaphragm from being ruptured under excessive pressures. Due to the fact that the liquid is being forced through the pipe line 10 under pumping means which create a pulsation of the pumped fluid it has been found desirable to place the pressure damping structure in the line of flow and to adjust it so that the pulsations will be damped and a pressure which is substantially constant will be imposed upon the gauge 32. This adjustment is brought about by rotating the adjusting stem 43 until the annular space 46 occurring around the threads of the member 45 will be restricted sufficiently to damp the pulsation while permitting fluid pressure to be exerted constantly therealong. As the pressure increases within the Bourdon tube 53 the free end of the tube 53 will be moved in the direction of the arrow a as indicated in Fig. 3. This will act through the slotted arm 57 and the gear segment 56 to rotate the pinion 60 and the stem 61 so that the indicating hand 62 will similarly rotate. It will be recognized that the set screw 58 may be adjusted with relation to the slotted arm 57 so that the indicating hand 62 will move appropriately to the pressure and will properly register with the calibrations on the face of the dial 64. In the event that there is variation in temperature which might effect the accuracy of the gauge a bi-metallic coil link 59 will compensate for this variation. As previously stated the gauge is filled with an incompressible fluid. This is introduced through the valve sleeve 37 and around the valve ball 38. By the regulation of this volume of fluid and the initial pressure imposed upon it, the hand 62 may be properly set with relation to zero on the dial. As the gear segment 56 swings at a uniform rate of movement the hand 62 will pass over the graduations on the dial here designated as indicating pressures from 0 to 1500# per square inch. When an imposed pressure exceeds 1500# per square inch the arm 63' of the gear segment 56 will encounter the pin 63. This pin has been selected with a different degree of flexibility so that additional resistance will be offered to the swinging movement of the gear segment 56. This will retard the movement of the gear segment so that the hand 62 will move a lesser distance under influence of any particular increase in pressure over 1500# than it did move to indicate the same amount of pressure below 1500#. Thus it will be seen that under high pressures which are not normal in the use of the gauge the hand will indicate the pressure over a relatively short range of the dial and in small increments of graduation while the hand will swing through relatively large increments of graduation easy to observe while operating under normal pressures.

It will thus be seen that the structure here disclosed is simple and rugged in construction, and design, that it offers effective means for indicating fluid pressures in a constantly flowing fluid stream, that it insures that pulsation of fluid pressures will be damped and furthermore that the indicating means will disclose variation in normal pressures over a dial having large increments of graduation, and higher pressures over a section of the dial having relatively small increments of graduation, whereby the service portion of the dial will be more readily readable.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A pressure gauge structure in combination with a conduit through which a fluid under pressure flows, which comprises a lateral connection with the conduit, a housing being formed with a pressure chamber therein in communication with said lateral connection through an induction passageway, the wall of said housing having an eduction passageway communicating with the pressure chamber, a flexible diaphragm disposed across the chamber and between the induction and the eduction passageways, the wall of said housing having a passageway extending transversely of the eduction passageway and in communication therewith, an outlet passageway in communication with the transverse passageway, a choke valve interposed between the eduction passageway and the outlet passageway, fluid responsive means carried by the housing and in communication with said outlet passageway, and valve means mounted in an end of the transverse passageway and through which fluid may be introduced into the passageway.

2. A unitary pressure gauge structure in combination with a conduit through which a fluid under pressure flows, said conduit having a lateral connection, a housing carried by said lateral connection and being formed with a pressure chamber therein, one wall of said pressure chamber having openings therethrough to receive fluid from the lateral connection, the other wall of said pressure chamber having an opening therethrough for the passage of an incompressible fluid with which the chamber is filled, a diaphragm structure interposed between said walls and adapted to flex under varying degrees of pressure of the fluid delivered from the lateral connection, the opening in the last named wall being formed with a T-shaped extension, a connection at one end of said extension through which said incompressible fluid may be delivered to the chamber within the housing, a choke valve in the opposite end of the extension through which said incompressible fluid may pass, said valve including means to damp the pulsation of said fluid, the extension of the passageway carrying the choke valve having an outlet opening therefrom, a pressure indicating device mounted directly upon the housing, fluid pressure responsive means forming a part thereof in communication with said outlet opening, and pressure indicating means actuated by said pressure responsive means.

WALTER R. MARTIN.